Feb. 9, 1926.  1,572,315
E. SCHOLL
MASK SET FOR MULTIPLE EXPOSURES IN MOVING PICTURE
CAMERAS AND PROCESS OF MAKING THE SAME
Filed Feb. 21, 1923
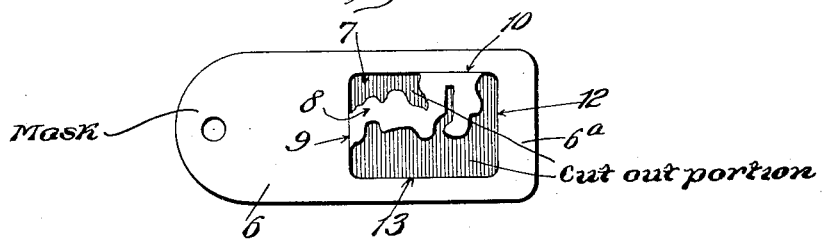
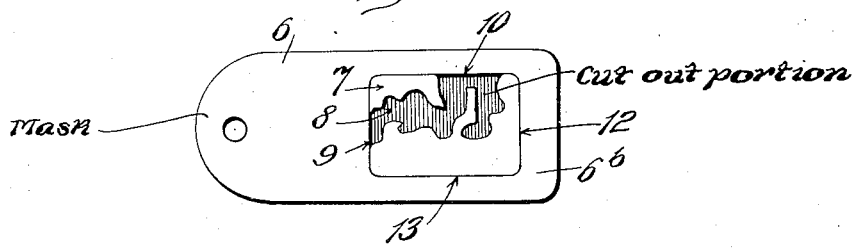
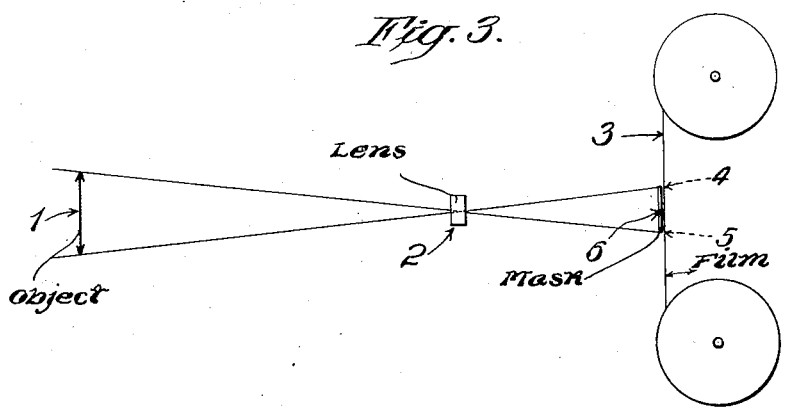

Patented Feb. 9, 1926.

1,572,315

UNITED STATES PATENT OFFICE.

EDWARD SCHOLL, OF NEW YORK, N. Y., ASSIGNOR TO D. W. GRIFFITH, INCORPORATED, OF NEW YORK, N. Y., A CORPORATION OF MARYLAND.

MASK SET FOR MULTIPLE EXPOSURES IN MOVING-PICTURE CAMERAS AND PROCESS OF MAKING THE SAME.

Application filed February 21, 1923. Serial No. 620,462.

*To all whom it may concern:*

Be it known that I, EDWARD SCHOLL, citizen of the United States, and a resident of the city, county, and State of New York, have invented a new and useful Improvement in Mask Sets for Multiple Exposures in Moving-Picture Cameras and Processes of Making the Same, of which the following is a specification.

When making multiple exposures it is often necessary to protect a part of a film from light and light effects while exposing a neighboring part and at a later exposure the neighboring part may be covered and protected and the originally protected part exposed, and if necessary, this protecting and exposing may be carried on indefinitely. For example, thirteen exposures may be had of one film, a part being covered each time so that when all exposures are complete, the entire film has been exposed. The covering of the parts of the film which is not exposed must be very accurate because of the great magnification when a positive is made and used in the ordinary manner.

The object of my invention is to provide a suitable mask or set of masks which must be utilized with the greatest accuracy so that the multiple exposures may be had and yet when the film is complete it will appear that there has been only one exposure. This and other objects are accomplished by my invention, one embodiment of which is hereinafter more particularly set forth.

For a more detailed description of my invention, reference is to be had to the accompanying drawings, forming a part hereof, in which Figure 1 shows a mask made according to my invention, and Figure 2 shows a second mask which is also made according to my invention and complementary to the mask shown in Figure 1.

Figure 3 is a diagrammatic view which illustrates the characteristics of my improved mask.

Throughout the various views of the drawings, similar reference characters designate similar parts.

Referring to Figure 3, it appears that an object 1 is before a camera of the moving picture type and that an image is caught by the lens 2 of this camera and in due course, in the absence of any interruption, would be projected on a film 3 in the conventional manner and that one exposure would cover an area corresponding to the distance between the points 4 and 5. Let it also be assumed that a sensitized metal plate 6 is placed immediately in front of the film 3 and as close thereto as possible without interfering with the film and an exposure had so that the image is caught on the plate 6 and not on the film 3. This plate 6 is then removed and developed, and let it be assumed that after development, the picture on this plate 6 will have two parts 7 and one part 8, it being understood that three parts are selected for the purposes of illustration and that any number of parts may be on this plate, as desired. Let it be further assumed that the parts 7 are bounded by the lines 9, 10 and 11 and the lines 9, 13, 12 and 11 and the part 8 by the lines 11, 9 and 13 and that the plate in Figure 1, which may be designated 6ª, is to have the part marked 8 removed and the plate in Figure 2, which may be designated 6ᵇ, will have the part marked 7 removed so that the plate 6ᵇ will be the complement of the plate 6ª. Then an etcher's needle is applied to the lines 11, 12 and 13 in the plate 6ª and to the lines 9, 10 and 11 in the plate 6ᵇ and a cut is made clear to the body of the plate. Except for these lines which are exposed, all other parts of the plate are protected and the plate is then immersed in acid which eats away the metal at the exposed lines and thereby makes the part 8 so that it is removed readily from the plate 6ª and the part 7 so that it is removed readily from the plate 6ᵇ. These plates are then complementary one to the other and an exposure may then be had with these plates or masks, as indicated in Figure 3, the first exposure being had, let us say, with the plate 6ª so that the exposure is entirely through the opening 8 and after that is had, the film 3 is reversed and put into its original position and then the mask 6ª is removed and the mask 6ᵇ substituted and thereafter the second exposure will be through the opening 7 so that the film is entirely protected and accurately protected during each exposure, except as to the parts where an exposure is desired and absolute accuracy is assured because of the manner in which each mask is made. Obviously, by increasing the number of removable parts 7 and 8 and the number of masks to correspond, it is possible to make an indefinite number of exposures to correspond.

The material of which each mask is made is a matter of selection according to results desired. If possible, a metal such as zinc, brass, silver or copper should be used, but where this is not possible, glass may be employed and some acid is then used which will attack only the unprotected parts and all parts are protected, except what is to be removed. The advantage of using glass is that a protected part may be left which is entirely surrounded by removed material, and the disadvantage is that glass is brittle and apt to break because of the jarring mechanical movements incidental to the mechanism of the camera. Because of this danger of breaking, I prefer to use metal plates wherever such can be employed.

It will be noted that if an exposure were had on the film 3 and this were transferred to a plate, as has been done before in making such masks, the picture so transferred would be a little too large and the reducing of it would be a matter of judgment which is almost sure to result in mistakes as no one can be perfectly accurate in judging where to reduce. By the use of my invention, no judgment is required at all because the plate is exposed in the exact position where it is to be used so that great accuracy is assured. Of course, this plate is very slightly out of focus, but the error is so slight that it is found to be immaterial and not noticeable in practice.

By the use of my invention, it has been possible to photograph actors with one or more exposures and a model of a building, such as the Bastile with one or more exposures and yet when the film is complete the actors will appear not before a model, but before a full sized structure which gives the effect of a complete film made with one of full sized objects beside life sized actors.

While I have shown and described one embodiment of my invention, it is obvious that it is not restricted thereto, but that it is broad enough to cover all structures that come within the scope of the annexed claims.

Having thus described my invention, what I claim is:

1. A process of making a plate of a mask set for multiple exposures in a moving picture camera which consists in exposing a sensitized plate so that an image is thrown directly upon it in the place where the mask is to be used and then developing the plate, outlining with an etching needle the form desired, protecting other parts of the plate and then permitting the etched lines to be eaten by an acid or similar means, whereby a mask is formed.

2. The process of making a plate of a mask set for multiple exposures which consists in sensitizing a plate and then exposing it in a moving picture camera in the position where it is to be used, then developing the same, and then removing by etching the part or parts of the plate through which a film is to be exposed.

3. A mask for moving picture cameras which is composed of a plate with parts removed according to an exposure of the plate had in the position in which the plate is to be used and while the plate was in a light, sensitive condition.

4. A mask for moving picture cameras which is composed of a plate with parts removed by etching according to an exposure of the plate had in the position in which the plate is to be used and while the plate was in a light, sensitive condition.

In testimony whereof, I have hereunto set my hand.

EDWARD SCHOLL.